Oct. 14, 1952          J. L. SHROYER          2,613,666
HOTEL TYPE PRESSURE COOKER
Filed April 8, 1946          3 Sheets-Sheet 1
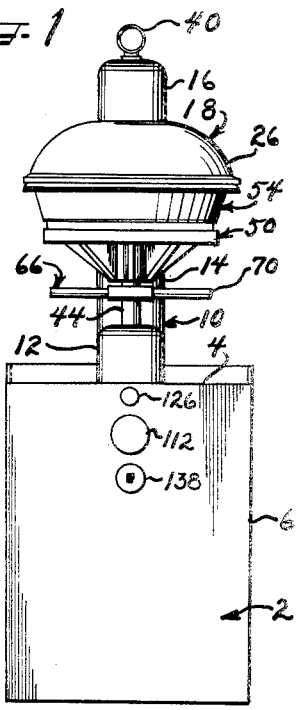
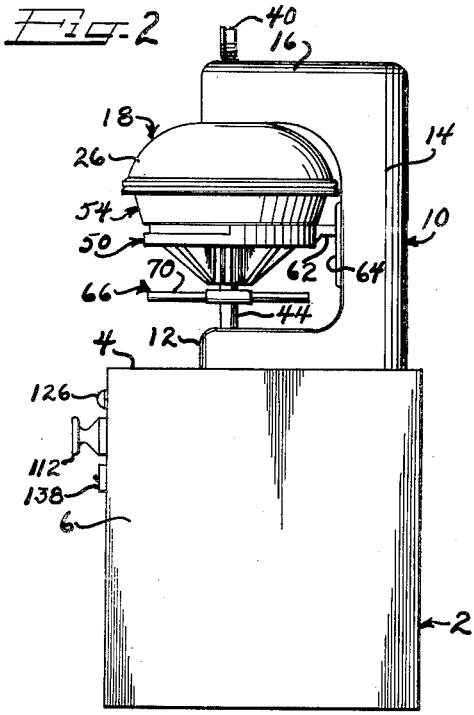
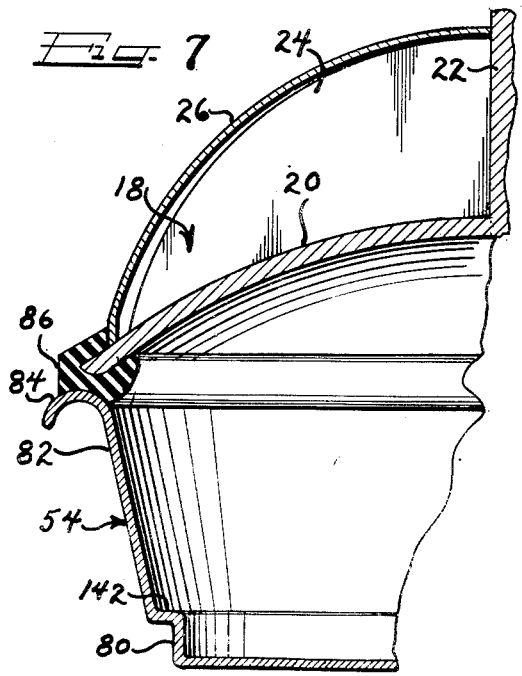
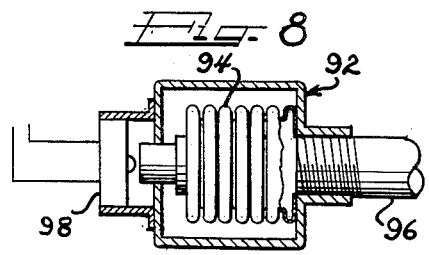
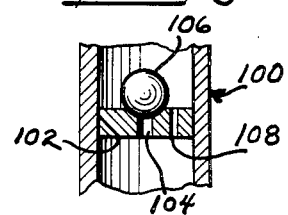
Inventor
JACOB L. SHROYER

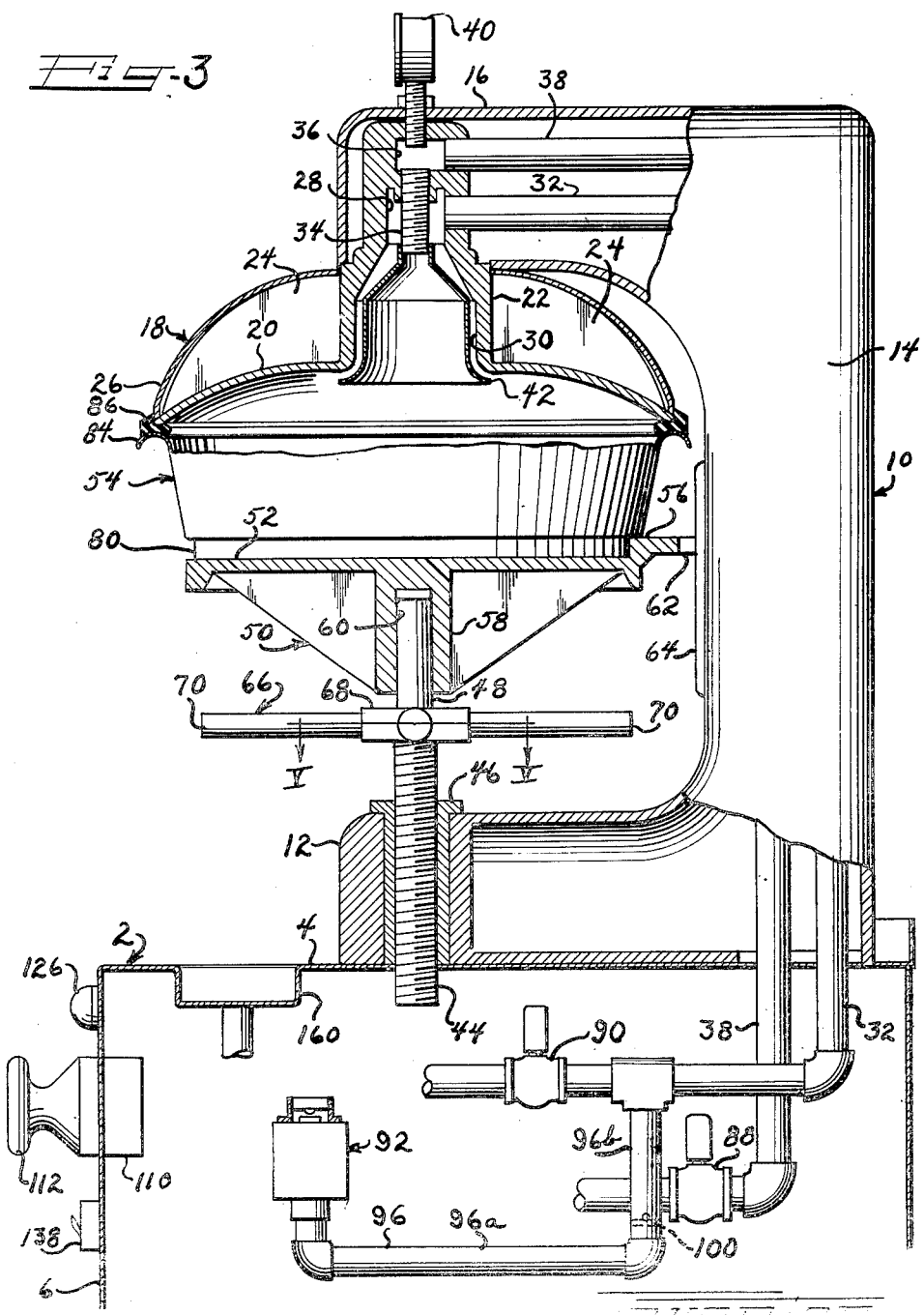

Oct. 14, 1952 J. L. SHROYER 2,613,666
HOTEL TYPE PRESSURE COOKER
Filed April 8, 1946 3 Sheets-Sheet 3
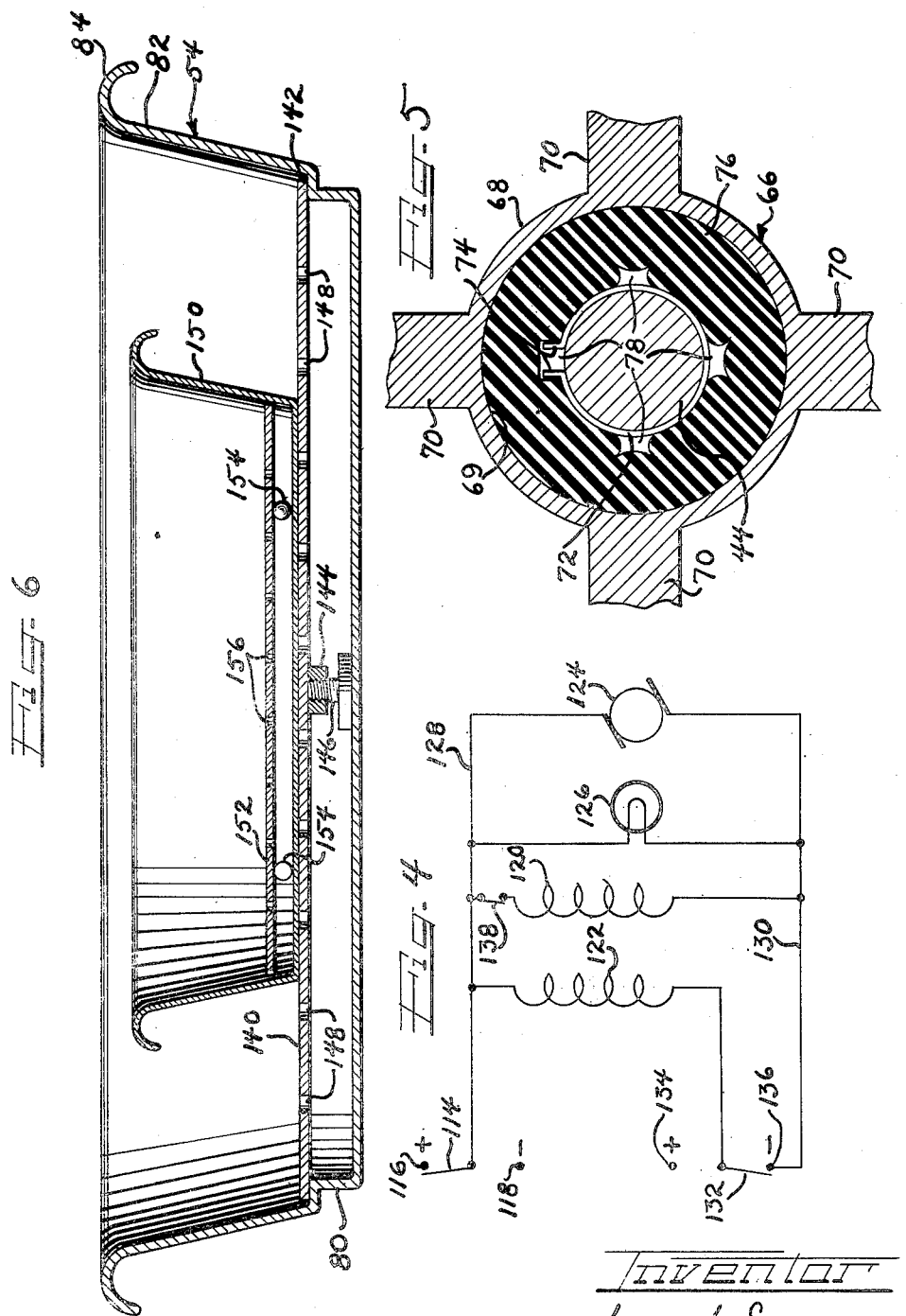
Inventor
JACOB L. SHROYER Patented Oct. 14, 1952

2,613,666

UNITED STATES PATENT OFFICE 2,613,666

HOTEL TYPE PRESSURE COOKER

Jacob L. Shroyer, Oak Park, Ill.

Application April 8, 1946, Serial No. 660,576

9 Claims. (Cl. 126—379)

This invention relates to a pressure cooker, and particularly to a pressure cooker for use by restaurants, hospitals, and other institutions wherein there is need for rapid cooking of large numbers of individual food orders.

A cooker embodying this invention may be utilized to prepare individual orders of food in an absolute minimum of time; furthermore, after the cooking process is once initiated in the cooker, the operator does not need to give the cooker any further attention, inasmuch as all of the operations thereof are completely automatic. This invention is, therefore, particularly applicable for restaurant use inasmuch as it permits the preparation of individual orders of vegetables, meats and the like, and hence permits each customer's order to be individually prepared subsequent to his ordering of such. Accordingly, this invention eliminates the necessity for the advance preparation of large quantities of meats and vegetables in anticipation of the expected demands of the trade and thus eliminates the wastage of food by excess preparation and the deterioration in appearance, flavor and vitamin content that accompanies such large quantity, advance preparation of foods.

A feature of this invention is the provision of a cabinet-type pressure cooker unit wherein the pressure cooking chamber is defined by a pair of cooperating casings, one of which is fixed to a suitable frame on the cabinet and the other of which is movable into sealing engagement with the fixed casing after insertion of the food articles to be cooked therein. The movement of the movable casing to its sealing position with respect to the fixed casing is conveniently accomplished by manual rotation of a spoke-like operating member. This invention further provides a friction clutch between the operating member and the casing positioning member which automatically assures that the movable casing will be brought up against the fixed casing with just sufficient force to provide a seal therebetween and without danger of injury to either casing. Furthermore, the friction clutch provided in accordance with this invention also prevents the inadvertent opening of the cooking chamber defined by the two casings while any substantial steam pressure exists therein.

Accordingly, it is an object of this invention to provide an improved pressure cooker.

A further object of this invention is to provide an improved pressure cooker for hotel, restaurant or institution use which will operate from a source of low pressure steam.

A further object of this invention is to provide an improved pressure cooker wherein the various operations for cooking a quantity of food may be accomplished in a minimum amount of time with a minimum amount of effort on the part of the operator.

A particular object of this invention is to provide a pressure cooker wherein the cooking chamber is defined by the cooperation of a fixed and movable casing, and the movable casing is supported by a positioning member by which it may be rapidly and conveniently moved from its open to its sealing position relative to the fixed casing.

Another particular object of this invention is to provide an improved positioning device for the movable casing of a pressure cooker wherein the movement of the positioning device is accomplished by manual rotation of a suitable spoke-like operating member and a friction driving connection is provided between such manually rotatable driving member and the positioning member.

The specific nature of the invention as well as other objects and advantages thereof will become apparent to those skilled in the art from the following detailed description of the annexed sheets of drawings which, by way of preferred example only, illustrate one specific embodiment of the invention.

On the drawings:

Figure 1 is a front elevational view of a complete pressure cooker unit constructed in accordance with this invention;

Figure 2 is a side elevational view of the pressure cooker of Figure 1;

Figure 3 is an enlarged scale view, partly in vertical section, of Figure 2, with the wiring connections deleted for purposes of clarity;

Figure 4 is a circuit diagram of the electric connections of the pressure cooker elements shown in Figure 3;

Figure 5 is a partial horizontal sectional view taken along the plane V—V of Figure 3;

Figure 6 is an enlarged scale vertical sectional view of the movable casing of Figure 3 and illustrates an individual food container inserted therein;

Figure 7 is an enlarged scale, sectional view of the seal construction between the fixed and movable casings of Figure 3;

Figure 8 is an enlarged scale, sectional view of the pressure actuated switch of Figure 3; and Figure 9 is an enlarged scale, sectional view of the fluid delay valve utilized in the construction shown in Figure 3.

As shown on the drawings:

The elements of the pressure cooker embodying this invention are conveniently housed in and mounted upon a box-like cabinet structure 2 having a top wall 4 and side walls 6. The control mechanism may be conveniently mounted on one of the side walls 6, for example, the front wall, while a frame member 10 of the pressure cooker is supported on the top wall 4 of the cabinet and the piping, control valves and electrical connections are disposed within the interior of the cabinet 2.

The frame 10 comprises a hollow casting having a base portion 12 which rests upon the top wall 4 of cabinet 2 and an upstanding pedestal portion 14 having an integrally formed arm 16 at the top thereof which overhangs base portion 12. A fixed casing 18, which might be said to constitute the cover casing for the pressure cooker unit is suitably secured to the outer end of overhanging arm 16 and supported in depending relation to such arm. The cover casing 18 comprises a generally spherical segment base portion 20 (Fig. 3) which is integrally formed with an axially extending hub portion 22. A plurality of upstanding ribs 24 are provided which are disposed in spaced relation about the periphery of hub 22. To maintain the exterior of cover casing 18 at a relatively low temperature to eliminate the possibility of accidental burns to the user of the equipment, a thin metallic, spherical segment cover 26 is provided which surrounds the hub 22 and completely encloses the ribs 24, being spaced outwardly from such ribs to minimize heat transfer between the cover casing 18 and the exterior cover 26.

The hub portion 22 of casing cover 18 is provided with an axially extending recess 28 having an enlarged counter-bored portion 30 at the bottom end thereof. A steam inlet pipe 32, which is disposed within the hollow interior of the frame 10, connects with recess 28 to supply steam to the interior of the casing cover 18. An outlet passage is formed by a hollow stud 34 which is screwed into a suitable hole in the top portion of recess 28 and communicates with a chamber 36. A fluid outlet pipe 38, also disposed within the hollow interior of the frame 10, connects with chamber 36. If desired, a pressure gauge 40 is screwed axially into the top end of hub 22 into communication with chamber 36 and thus serves to visually indicate the steam pressure existing during the cooking operation.

To improve the circulation of steam supplied through inlet pipe 32, a baffle or distributing member 42 may be provided comprising a generally annular sheet metal member having the top end thereof threaded onto the exterior of hollow stud 34 and having its exterior surface generally conforming to, but spaced inwardly from, the adjacent internal surface of recess 28. Steam from inlet pipe 32 is thus directed by baffle 42 outwardly along the periphery of cover casing 18 and hence produces a desirable circulatory action within the sealed chamber formed by the cooperation of cover casing 18 and a movable casing to be described.

In the base portion 12 of frame 10, in a position immediately underlying the axis of cover casing 18, a positioning member 44 is mounted comprising an exteriorly threaded stud which threadably engages an interiorly threaded bushing 46 pressed into the base portion 12. The stud 44 is thus positioned in upstanding relationship and the top end thereof is provided with a cylindrical surface 48 on which is rotatably journaled and supported a platform 50.

The platform 50 comprises a generally circular member having at the top thereof a horizontal, generally circular surface 52 arranged to support a food container casing 54. The back peripheral portion of the platform 50 is provided with a semi-circular, upstanding rib 56 which facilitates the positioning of the container casing 54 on the platform 50 in proper relationship to cooperate with the casing cover 18 in a manner which will be described.

The platform 50 is also provided with an integrally formed, depending hub portion 58 which defines a cylindrical bearing recess 60 by which the platform 50 is rotatably journaled and supported on the top end of positioning stud 44. On that portion of platform 50 which is adjacent to the pedestal portion 14 of frame 10, an outwardly projecting, bifurcated portion 62 is provided which cooperates with a vertically extending rib 64 on pedestal portion 14 to secure platform 50 against rotative movement relative to the frame 10 but to freely permit vertical movement of platform 50 relative to the frame 10.

To permit the rapid and convenient manual adjustment of the vertical position of platform 50, a spoke-like manual operating member 66 is provided having a hub portion 68 surrounding the cylindrical surface portion 48 of stud 44 and a plurality of radially projecting spokes 70. In accordance with this invention, a friction clutch or slip drive connection is provided between the manual operating member 66 and the positioning stud 44. Such friction clutch arrangement may comprise any one of several well known forms such, for example, as a split friction ring 72 (Fig. 5) which snugly surrounds positioning stud 44 and has its end portions 74 outturned to project into one of a plurality of recesses 78 provided in an annular body 76 of rubber or other compressible material. The annular body of rubber 76 is disposed in the bore 69 of the hollow hub portion 68 of manually operated member 66 and is suitably secured thereto.

From the described construction, it will be apparent that rotation of the manual operating member 66 in either direction produces a tightening of the friction ring 72 on the positioning stud 44 sufficient to cause the stud 44 to be rotated relative to its threaded supporting bushing 46 and hence moved vertically with respect to the frame 10; however, upon the occurrence of any substantial force resisting the vertical movement of the positioning stud 44, the split friction ring 72 will slip on the stud 44 and hence effectively limit the amount of rotative force which can be applied to stud 44 by the manual operating member 66.

The container casing 54 which is supported on platform 50 comprises a pan-like member having the bottom portion 80 of its side walls formed in generally cylindrical configuration which cooperates with the upstanding rib 56 on platform 50 to snugly position container casing 54 thereon. The side walls 82 of container casing above the cylindrical portion 80 are flared outwardly and the top rim portion 84 of the casing is formed by bending the side walls outwardly in an arcuate configuration. The diameter of rim portion 84 of the container casing 54 is substantially identical with the peripheral diameter of cover casing 18. As indicated in Figure 7, an annular seal 86 of rubber or other suitable material is snapped over the rim of cover casing 18 and is suitably shaped to cooperate with the rim 84 of the container casing 54 to provide a pressure-tight seal between these members when the container casing 54 is moved upwardly into abutting relationship with the cover casing 18 by rotation of manual operating member 66.

It is therefore apparent that the fixed cover casing 18 and the movable container casing 54 cooperate to define a sealed chamber to which steam may be supplied under pressure through inlet pipe 32, assuming, of course, that the air initially trapped in the sealed chamber is permitted to bleed off through the outlet pipe 38, whereafter the outlet pipe is closed by a suitable valve means to be described. A steam pressure suitable for cooking food may be readily built up within the sealed chamber provided by the co-operating fixed and movable casings, depending only upon the available pressure of the steam supply source.

It should be noted that the friction clutch unit provided between the manual operating member 66 and the positioning stud 44 not only prevents the movable casing 54 from being brought up against the fixed cover casing 18 with an excessive force likely to deform or injure such casings, but in addition, when steam pressure is built up within the cooperating casings, the resulting downward force on the movable casing 54, and hence on the platform 50, produces a wedging action on the threads on the movable stud 44 which causes sufficient resistance to rotation of the positioning stud 44 to cause the friction clutch unit to slip. Accordingly, it is impossible for the operator to inadvertently open the steam-filled chamber defined by the cooperating casings so long as any substantial pressure exists therein.

Both the steam inlet pipe 32 and the outlet pipe 38 extend downwardly through the hollow frame member 10 into the interior of cabinet 2. Inlet pipe 32 is connected through a suitable solenoid operated valve 90 to a suitable source of low pressure steam (not shown). Outlet pipe 38 is in turn connected through a similar solenoid controlled valve 88 to a suitable drain pipe (not shown). A pressure responsive electric switch 92 is arranged to be responsive to the pressure existing within the sealed chamber defined by the cooperating casings by suitable piping 96 which connects such switch into the inlet pipe 32. Pressure responsive switch 92 may comprise any one of several well known forms of pressure actuated electric switches, the essential characteristics of which are that they shift a switch blade member between a pair of electric contacts upon the attainment of a predetermined pressure in the fluid system in which they are connected. For example, as illustrated in Figure 8, pressure responsive switch 92 may comprise a Sylphon 94 which is expanded by the air pressure existing within such Sylphon and its connecting pipe 96 to operate an electric switch unit 98.

In one practical embodiment of this invention, when steam is supplied to inlet pipe 32 from a suitable source providing a pressure of from 10 to 20 pounds per square inch gauge, it has been observed that even with outlet valve 88 in its open position, a pressure of about 8 pounds per square inch gauge will be developed in the sealed chamber defined by the cooperating casings due to the pressure resistance of the outlet piping. It is, of course, necessary that the outlet valve 88 remain open for a sufficient length of time to insure the substantial exhaustion of all air from the sealed chamber and the cooperating piping. Since the pressure of about 8 pounds is built up within the system very quickly upon the admission of steam to inlet pipe 32, it is not sufficient to control the closing of outlet valve 88 merely by the operation of pressure switch 92 in response to the attainment of the approximately 8 pounds of pressure within the system. To insure that the air is completely exhausted from the system, it has been found desirable to provide a delayed operation of pressure switch 92. In accordance with this invention, such delayed operation is effectively accomplished by the provision of a delay valve 100 disposed in the pipe 96 which transmits the pressure of the system to the Sylphon 94 of the pressure actuated switch 92.

As is more clearly shown in Figure 9, the delay valve 100 comprises a transverse web or partition 102 disposed across the vertical portion 96b of pipe 96. Partition 102 is provided with a primary aperture 104 therein, the top side of which is shaped to form a seat for a ball valve 106. A secondary aperture 108 is also provided in web 102 in by-pass relationship to primary aperture 104. The operation of delay valve 100 is therefore apparent from the construction described. In its initial condition, there will, of course, be a quantity of condensed fluid disposed in the pressure switch piping. This trapped fluid will fill the horizontal portion 96a and the vertical portion 96b of pipe 96 and hence the air trapped in the interior of Sylphon 94 will be responsive to the pressure transmitted by the trapped fluid. Upon the admission of steam to the system through inlet pipe 32, the increase in pressure in the system will tend to force that portion of the trapped water disposed in the vertical pipe 96b downwardly through the delay valve 100. However, the rate of flow of fluid through delay valve 100 is governed entirely by the relatively small diameter of the by-pass aperture 108, inasmuch as the ball valve 106 effectively prevents fluid flow in a downward direction through the primary aperture 104. Accordingly, the transmission of the increase pressure in the system to the Sylphon 94 is delayed a sufficient time to insure that the air originally in the ssytem will be completely exhausted through outlet valve 88 prior to the closing of the contacts (not shown) of pressure actuated switch 92.

The control circuit provided in accordance with this invention for energization of the inlet valve 90 and the outlet valve 88 permits the cooking operation to be carried out entirely automatically. An electrical timing switch 110 is provided, having a manual operating knob 112 disposed on the front wall of the cabinet 2, which controls the initiation, duration and termination of the pressure cooking operation. The timer switch 110 may comprise any one of several well known, commercially available switches and it will therefore not be described in detail aside from the fact that its construction is preferably such as to provide a single pole switch (not shown) having two independent contact closing positions, and arranged such that the setting of the knob 112 shifts the switch to one of its contact closing positions where it remains until the end of the time period for which it has been set, whereupon it shifts back to the other of its contact closing positions.

The switch element of the timing switch 110 is indicated schematically as the switch blade 114 in the circuit diagram of Figure 4 and the contacts 116 and 118 represent respectively the two independent contact making positions of the timing switch 110. Contact 116 is connected to one side of a suitable source of electric power while the contact 118 is connected to the other side of such source. The operating solenoids for the inlet valve 90 and the outlet valve 88 are represented respectively by the coils 120 and 122. The timing motor 124 for the electric timing switch 110, as well as the indicating light 126, are connected in parallel with the inlet valve coil 120 across a conductor 128 which is connected to switch blade 114 and a conductor 130 which is connected to a contact 136 connected the same side of the power source as the contact 118.

The switch unit 98 of the pressure operated switch 92 also comprises a single throw switch which is shiftable between either of two contact making positions and is represented in Figure 4 by the switch blade 132 and the contacts 134 and 136. Contact 134 is connected to the same side of the source of power as contact 116 while contact 136 is connected to the same side of the source of power as contact 118. The coil 122 for the outlet valve 88 is connected between conductor 128 and switch blade 132 of the pressure responsive switch 92. The solenoid controlled inlet valve 90 and outlet valve 88 are each of the type which are normally closed when their respective coils are deenergized. In the off position of timer switch 110, the switch blade 114 is disposed in contact with contact 118; in the position of pressure responsive switch 92 corresponding to zero pressure in the cooker system, the switch blade 132 is disposed in engagement with contact 136. It is therefore apparent that under such initial conditions, none of the electrical elements are energized.

Upon the operation of timer switch 110 to initiate a cooking period of a length determined by the particular setting to which the timer switch 110 is adjusted, the switch blade 114 of timer switch 110 is shifted to engagement with the contact 116 and the circuit is in the condition illustrated in Figure 4. In such condition, it will be apparent that the inlet valve coil 120, the timing motor 124 and the indicating light 126 will all be energized and, accordingly, steam will be supplied to the sealed chamber defined by the cooperating casings through inlet valve 90 and inlet pipe 32. The outlet valve coil 122 is also energized and hence the air residing in the cooker system may be driven out of the system through outlet valve 88; however, as previously mentioned, the pressure in the system builds up to a nominal value, for example about 8 pounds which is sufficient to secure the operation of pressure switch 92. The operation of pressure switch 92 is however delayed by the action of delay valve 100 so that pressure switch 92 does not operate until a sufficient period of time has elapsed to insure that all of the air trapped in the pressure cooker system will be driven out through the outlet valve 88. The operation of pressure responsive switch 92 shifts the switch blade 132 from its position of engagement with contact 136 to engagement with contact 134. This has the effect of connecting both sides of the outlet valve coil 122 to the same side of the power source; hence, outlet coil 122 will be deenergized and outlet valve 88 will close.

Accordingly, the pressure in the sealed chamber defined by the cooperating casings will rise to a suitable value for cooking which is determined by the pressure of the supply source.

The cooking operation will continue until a period of time has elapsed corresponding to the particular setting of the timer switch 110. Upon the completion of such time period, the switch blade 114 of timer switch 110 is moved from its position of engagement with contact 116 into engagement with contact 118. This action deenergizes the inlet valve coil 120, the timing motor 124 and the indicating light 126, by virtue of the fact that both sides of such elements are connected to the same side of the source of electric power. The outlet valve coil 122, however, is energized by the shift of the switch blade 114. Accordingly, inlet valve 90 is closed and outlet valve 88 is opened and the pressure in the sealed chamber defined by the cooperating casings is exhausted through the open outlet valve 88. The pressure in the system, of course, drops very rapidly, and in the course of its falling off, it will reach a point wherein the air pressure in the Sylphon 94 of the pressure actuated switch 92 will be in excess of the pressure in the cooker system. Such pressure will operate to force the trapped water in the pressure switch 96 back through the delay valve 100 and hence operate the switch unit 98 to its other position wherein the switch blade 132 is restored to its original position in engagement with contact 136. It will, of course, be apparent that the ball valve 106 of delay valve 100 offers little if any resistance to the upward flow of the trapped water through the large primary aperture 104. Pressure switch 92 is arranged to effectuate the shift of its switch blade when the pressure substantially reaches zero. Hence, the electrical elements of the system are restored to their initial position, the pressure has been exhausted from the cooking chamber, and the movable casing 54 may be withdrawn from the fixed cover casing 18 by rotation of the manual operating member 66. The entire container casing 54 may then be removed from the cooker and utilized as a serving vessel or the food therein may be transferred to an additional container for serving.

In the cooking of some foods, I have found it desirable to maintain the inlet valve 90 open for only a portion of the period during which pressure is maintained within the sealed chamber defined by the cooperating casings. Such modification of the cooking process may be very conveniently obtained by the insertion of a suitable manually operated switch 138 in circuit with the inlet valve coil 120.

By operating switch 138, the operator may at any time cut off the supply of steam to the cooking chamber without disturbing the duration of the period for which the pressure within the chamber will be maintained by the particular adjustment of the timer switch 110.

In the operation of the aforedescribed pressure cooker, I have observed that an appreciable amount of condensate tends to collect in the bottom of the container casing 54 or, if a secondary container is placed within casing 54 and the food articles to be cooked disposed in the second container, again the condensate will collect in the bottom of the second container. Those portions of the food articles which are disposed in contact with the condensate do not receiver the same degree of heating as the remaining portions of the articles which are subjected only to the action of the low pressure steam. Furthermore, the flavor, appearance and vitamin content of those portions of the food articles which are immersed in the condensate are detrimentally affected thereby. To overcome such disadvantageous feature, this invention provides a special construction for both the primary and secondary containers of the cooker. As is shown in Figure 6, the primary container 54 is provided with a tray 140 which extends across the base of the container but in spaced relationship above such base. The tray 140 may conveniently rest upon the upwardly facing shoulder 142 formed at the juncture of the otwardly tapering side portions with the bottom cylindrical wall portion of container 54. The tray 140 may be secured within container casing 54 through the cooperation of a nut 144 secured in depending relation to tray 140 with an upstanding threaded stud 46 secured on the face of container casing 54. Tray 140 is provided with a plurality of spaced apertures 148 which insures that all condensate within the casing 54 will be collected along the bottom portion thereof below the top surface of tray 140. Accordingly, food articles disposed directly on tray 140 will be maintained out of contact with the condensate and their food properties thereby substantially improved.

In the event that a secondary container 150 is utilized for supporting the food articles in the cooking process, such container is provided in accordance with this invention with a tray 152 rigidly secured in spaced relation above the bottom of secondary container 150 in any suitable manner such as by mounting on ball elements 154. Tray 152 is likewise provided with a plurality of apertures 156 to insure that all condensate will be collected in the bottom of the secondary container 150. The secondary container 150 has the particular advantage of permitting the food to be cooked and served without the necessity of further handling by the cook or transfer from a cooking container to a serving container. Both during cooking and serving, the food articles are maintained out of contact with the condensate which collects below the tray 152 in the bottom of secondary container 150.

The operation of the pressure cooker embodying this invention is deemed to be obvious from the foregoing description of the elements thereof. The food articles to be cooked are placed in either the primary or secondary containers disposed on the respective trays thereof and the primary container casing 54 is then placed on platform 50 and the manual operating member 66 spun by hand to raise the platform 50 to bring the container casing 54 into sealing engagement with cover casing 18. The operating knob 112 of the timing switch 110 is then manipulated to select the proper time of cooking of the particular food article and from that point on the cooking process is initiated, carried on and terminated automatically without further action or attention from the operator, unless of course, the operator desires to cut off the supply of fresh steam to the cooking chamber prior to the termination of the cooking period, which he may do by operation of switch 138. The indicating light 126 informs the operator that the pressure cooking operation is in process and hence warns him against attempting to manipulate the manual operating member 66 to open the sealed cooking chamber defined by the cooperating casings. Even though the indicating light 126 be disregarded, the operator still cannot inadvertently open the cooking chamber inasmuch as the pressure therein will produce sufficient resistance to rotation of positioning stud 44 to cause the friction clutch unit to slip and hence render manual operating member 66 ineffective until the pressure has been removed from the cooperating casing. The cooking operation is automatically terminated and the pressure withdrawn through outlet valve 88. Concurrently, the indicating light 26 goes out notifying the operator of the conclusion of the cooking process. The platform 50 may then be lowered by spinning the manual operating member 66 and the food articles removed from the container casing 54 or served directly to the table therein. If desired, a drain 160 (Fig. 3) may be provided on the top wall 4 of cabinet 2 to permit convenient disposal of condensate at the cooker location.

It should be particularly noted that a pressure cooking apparatus embodying the invention is so convenient in its operation and so greatly reduces the total preparation time for all ordinary table foods that individual orders of food may be prepared subsequent to the ordering thereof by the customer; hence there is no necessity for large quantity advanced preparation of foods with the attendant wastage and deterioration in flavor, appearance and vitamin content.

It will, of course, be understood that various details of construction may be varied through a wide range without departing from the principles of this invention, and it is therefore, not the purpose to limit the patent granted hereon otherwise than necessitated by the scope of the appended claims.

I claim as my invention:

1. A pressure cooker comprising in combination a frame, a fixed casing supported on said frame, a movable casing mounted on said frame independently of said fixed casing for linear movement relative to said fixed casing, means for linearly moving said movable casing into abutting, sealing relation with said fixed casing, whereby said casings define a sealed chamber adapted to contain food articles to be cooked, said means including a friction clutch for preventing additional sealing force between said abutted casings after a seal has been provided therebetween and means for supplying steam to said chamber.

2. A pressure cooker comprising in combination a frame, a fixed casing secured to said frame, a movable casing movably mounted on said frame, a positioning member for said movable casing having threaded engagement with said frame, whereby rotation of said positioning member moves said movable casing into abutting engagement with said fixed casing, said fixed and movable casings being constructed and arranged to define in their abutting position a sealed chamber adapted to contain food articles to be cooked, means for manually rotating said positioning member including a friction clutch permitting slipping movement of said last mentioned means relative to said positioning member to prevent additional sealing force from being exerted between the abutted casings after an effective seal has been provided therebetween, and means for supplying steam under pressure to said chamber.

3. A pressure cooker comprising in combination, a frame having base portion and an overhanging pedestal portion, a cover casing secured to said pedestal portion in depending relation thereto, a positioning member threadably engageable with said base portion for vertical movement relative to said frame, a food container casing supported on said positioning member, whereby rotation of said positioning member moves the food container casing into abutting engagement with said cover casing to define a sealed chamber, means for manually rotating the positioning member including a friction clutch permitting slipping movement of said last mentioned means relative to said positioning member to prevent additional sealing force from being exerted between the abutted casings after an effective seal has been provided therebetween, and means for supplying steam to said chamber through said cover casing.

4. A pressure cooker comprising in combination, a frame having a base portion and an overhanging pedestal portion, a cover casing secured to said pedestal portion in depending relation thereto, a positioning stud threadably mounted in said base portion in upstanding relation thereto, a platform having a central depending boss with an elongated axial bore, said stud having a smooth cylindrical upper end portion rotatably journaled in said bore and supporting the platform, means on said platform engageable with said frame to prevent rotational movement of said platform but permit vertical movement of said platform relative to said frame, a food container centrally supported on said platform, whereby rotation of said stud moves said container axially upwardly into engagement with said cover casing to define a sealed chamber, and means for supplying steam to said chamber.

5. A pressure cooker comprising in combination, a frame having a base portion and an overhanging pedestal portion, a cover casing secured to said pedestal portion in depending relation thereto, a positioning stud threadably mounted in said base portion in upstanding relation thereto, a platform rotatably journaled on and supported by said stud, means on said platform engageable with said frame to prevent rotational movement but permit vertical movement of said platform relative to said frame, a food container supported on said platform, whereby rotation of said stud moves said food container upwardly into engagement with said cover casing to define a sealed chamber, a manually rotatable hub surrounding a portion of said stud, a friction clutch element disposed in said hub and engageable with said stud to provide a slipping drive connection between said manually rotatable hub and said stud, said slipping drive connection preventing additional upward force from being applied to said food container after an effective sealing engagement has been achieved between the container and the cover casing and means for supplying steam to said chamber.

6. In a pressure cooker, a fixed casing member, a movable casing member cooperating therewith to define a sealed chamber adapted to contain food to be cooked, said fixed casing defining a steam inlet passage, a hollow tubular member having a flared end portion centrally disposed in said inlet passage, said tubular member having the bore thereof adapted to connect with a fluid outlet passage and the exterior surface of the member and the flared end portion cooperating with the adjacent internal surface of said inlet passage to produce a circulating movement of steam entering said chamber.

7. A pressure cooker comprising in combination a frame, a pair of casings independently supported on said frame, controllable means whereby said casings may be moved together, said casings defining a sealed chamber in their proximate positions adapted to contain food articles to be cooked, said controllable means including a friction clutch to prevent additional sealing force between the abutted casings after an effective seal has been provided therebetween and means for supplying steam under pressure to said chamber.

8. A pressure cooker comprising, in combination, a frame having a base portion and an overhanging pedestal portion, a cover casing supported by said pedestal portion in depending relation thereto, a cooking and serving vessel removably supported by said base portion and adapted to contain food articles, positioning mechanism engageable with said frame and adapted to move said casing and said vessel linearly relative to one another between remote and proximate positions, said casing and said vessel defining a sealed chamber in their proximate positions for containing the food articles therein, means for manually actuating said positioning mechanism including a friction clutch permitting slipping movement of said actuating means relative to said positioning mechanism to prevent additional sealing force from being exerted between said casing and said vessel when in their proximate positions after an effective seal has been provided therebetween, and controllable means for supplying steam under pressure to said chamber to cook the food articles therein, whereby, after the food is cooked, the steam supply cut off and said vessel and said casing relatively moved to their remote positions, said vessel may be removed from said base portion and utilized for serving the food contained therein.

9. In a pressure cooker including a pair of casings relatively movable between remote and proximate positions and defining a sealed chamber of circular cross-section adapted to contain food when said casings are in their proximate positions, means for supplying steam under pressure to said chamber comprising a hollow tubular member extending axially of said chamber having a flared end portion disposed in said chamber with its outer surface in closely spaced concentric relation to a defining wall thereof, the outer surface of said tubular member and flared end portion cooperating with the adjacent wall to define an annular passage and thereby to produce a circulatory movement of steam entering said chamber by deflecting the entering steam into paths substantially parallel to the wall of the chamber.

JACOB L. SHROYER.

REFERENCES CITED

The following references are of record in the file of this patent:

UNITED STATES PATENTS

| Number | Name | Date |
|---|---|---|
| 374,755 | Reed | Dec. 13, 1887 |
| 996,554 | Baldwin et al. | June 27, 1911 |
| 1,151,295 | Schlueter | Aug. 24, 1915 |
| 1,468,615 | Guttenstein | Sept. 18, 1923 |
| 1,627,770 | Durkee | May 10, 1927 |
| 1,636,768 | Ford | July 6, 1927 |
| 1,865,973 | Shields | July 5, 1932 |
| 2,270,327 | Mills | Jan. 20, 1942 |
| 2,427,564 | Le Claire | Sept. 16, 1947 |